Figure 1:
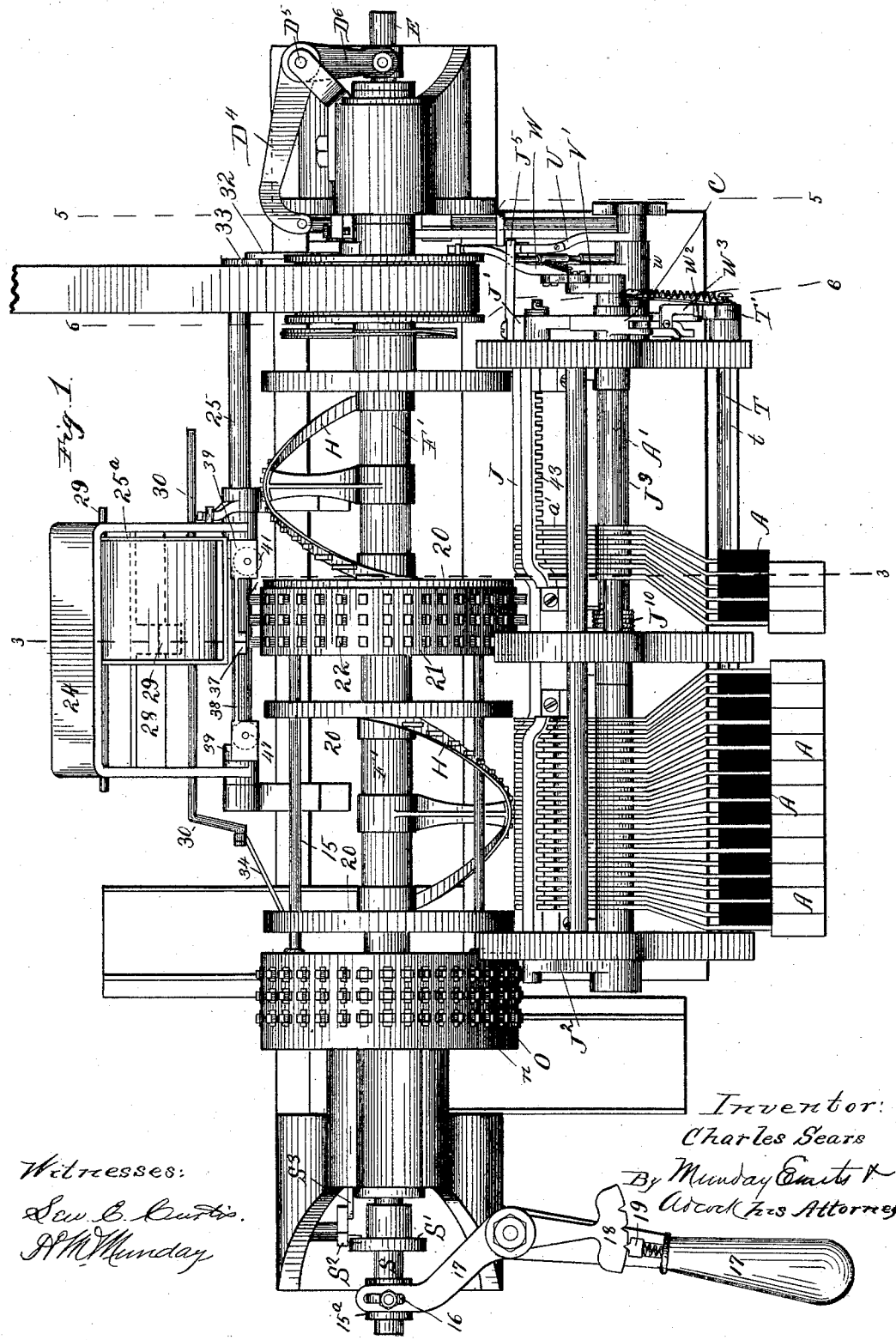

(No Model.) 9 Sheets—Sheet 1.
C. SEARS.
MATRIX MAKING MACHINE.

No. 475,804. Patented May 31, 1892.

Witnesses:
Geo. E. Curtis.
H. M. Munday

Inventor:
Charles Sears
By Munday Evarts &
Adcock his Attorneys (No Model.) 9 Sheets—Sheet 2.

C. SEARS.
MATRIX MAKING MACHINE.

No. 475,804. Patented May 31, 1892.

Witnesses:
Lew. E. Curtis.
H. M. Munday

Inventor:
Charles Sears
By Munday, Evarts & Adcock
his Attorneys.

(No Model.) 9 Sheets—Sheet 3.
C. SEARS.
MATRIX MAKING MACHINE.
No. 475,804. Patented May 31, 1892.
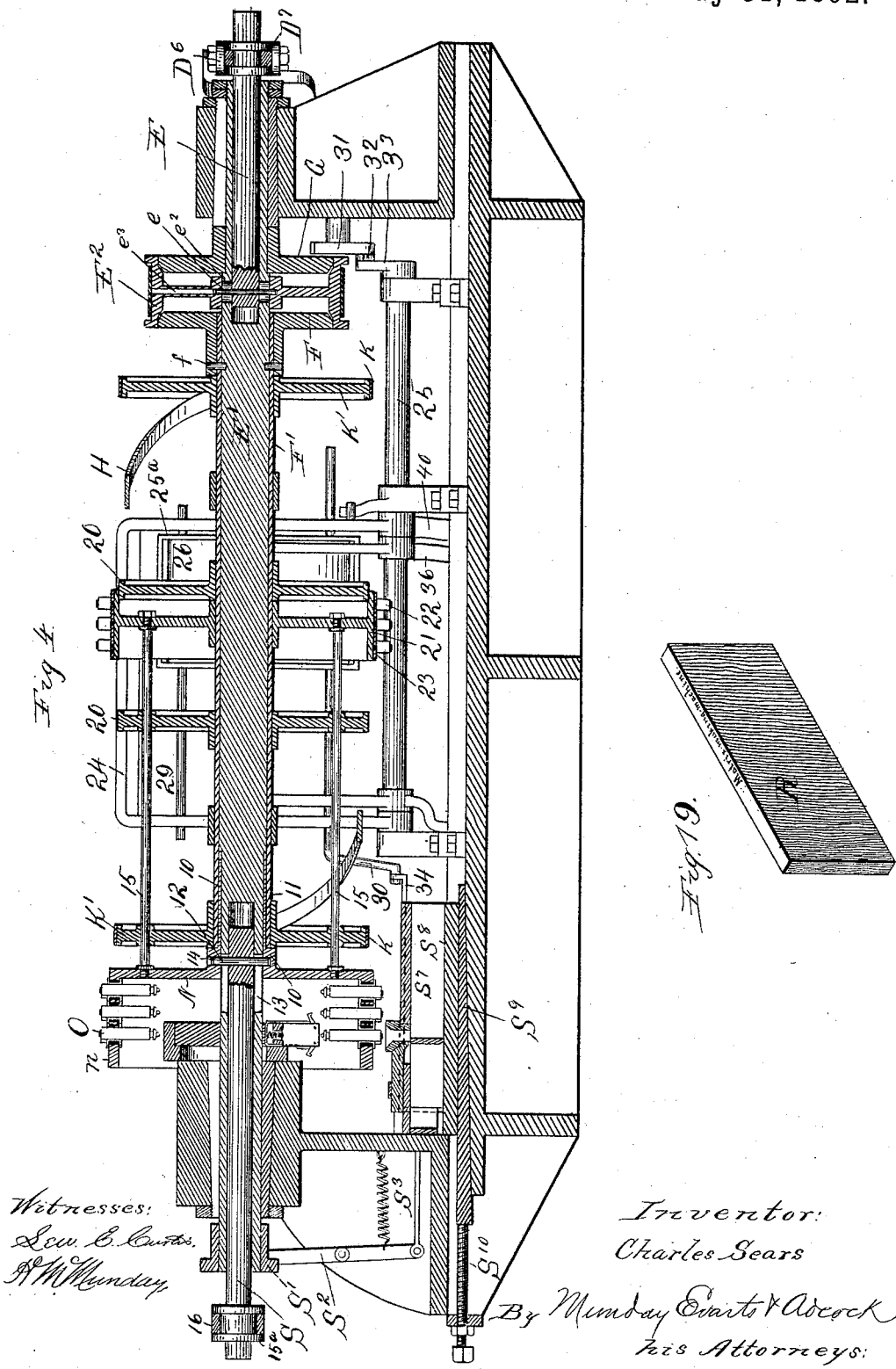
Witnesses:
Lew. E. Curtis.
R. W. Munday.
Inventor:
Charles Sears
By Munday Evarts & Adcock
his Attorneys.

(No Model.) 9 Sheets—Sheet 4.
C. SEARS.
MATRIX MAKING MACHINE.
No. 475,804. Patented May 31, 1892.
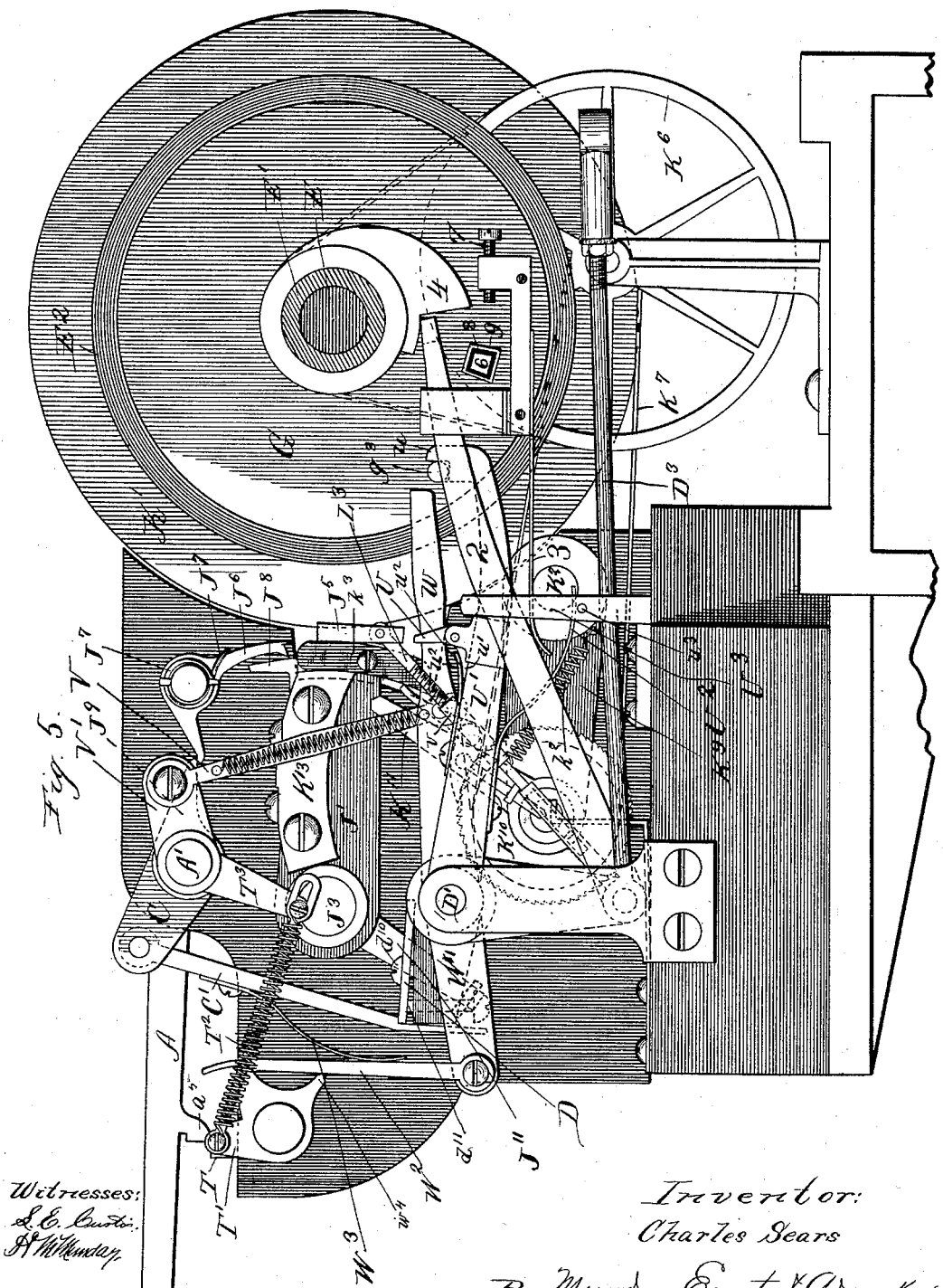
Witnesses:
L. E. Curtis
H. M. Munday
Inventor:
Charles Sears
By Munday Evarts & Adcock
his Attorneys.

(No Model.)
9 Sheets—Sheet 5.
C. SEARS.
MATRIX MAKING MACHINE.
No. 475,804.
Patented May 31, 1892.
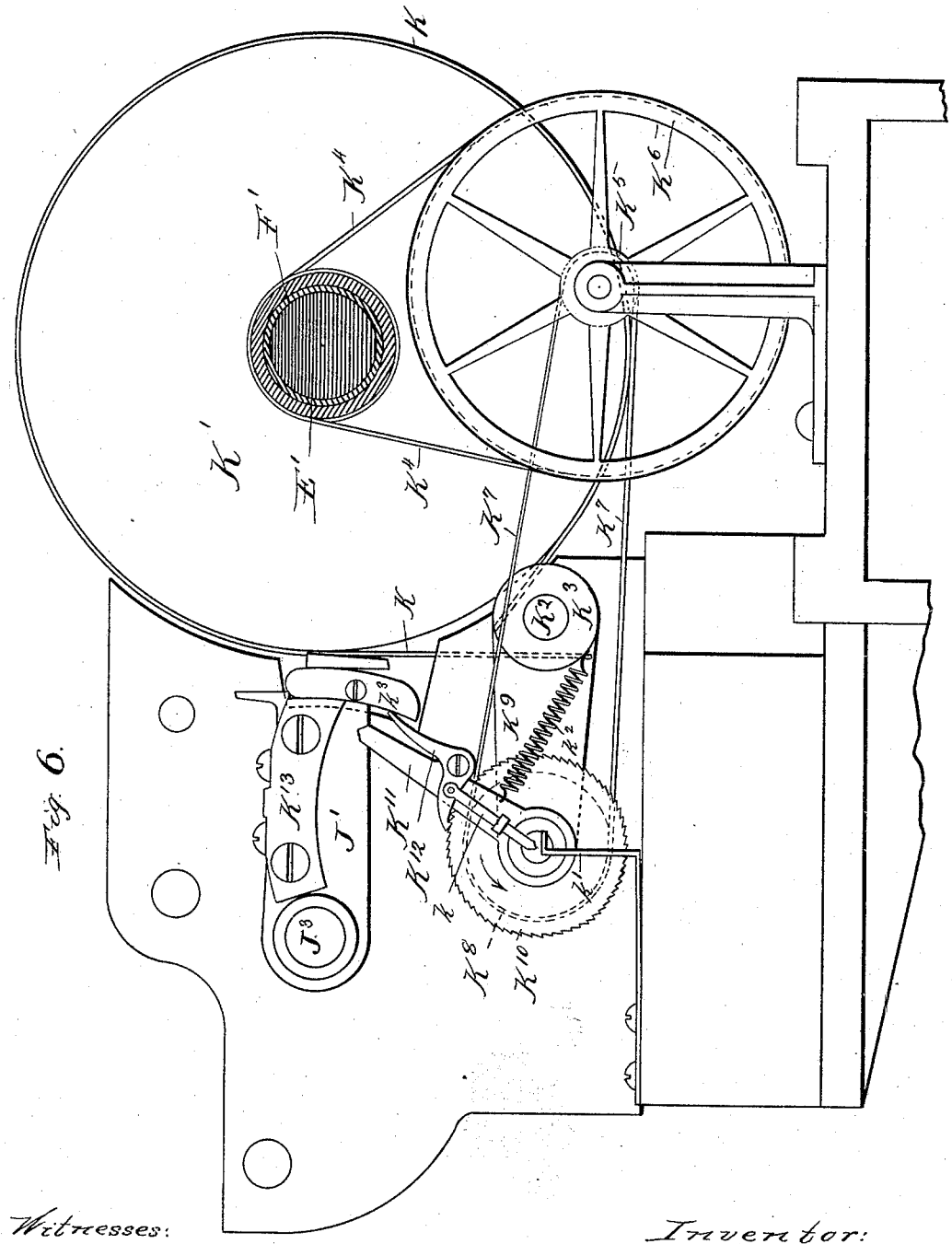
Witnesses:
Lew. E. Curtis
H. M. Munday
Inventor:
Charles Sears
By Munday, Evarts & Adcock
his Attorneys (No Model.) 9 Sheets—Sheet 6.
C. SEARS.
MATRIX MAKING MACHINE.
No. 475,804. Patented May 31, 1892.
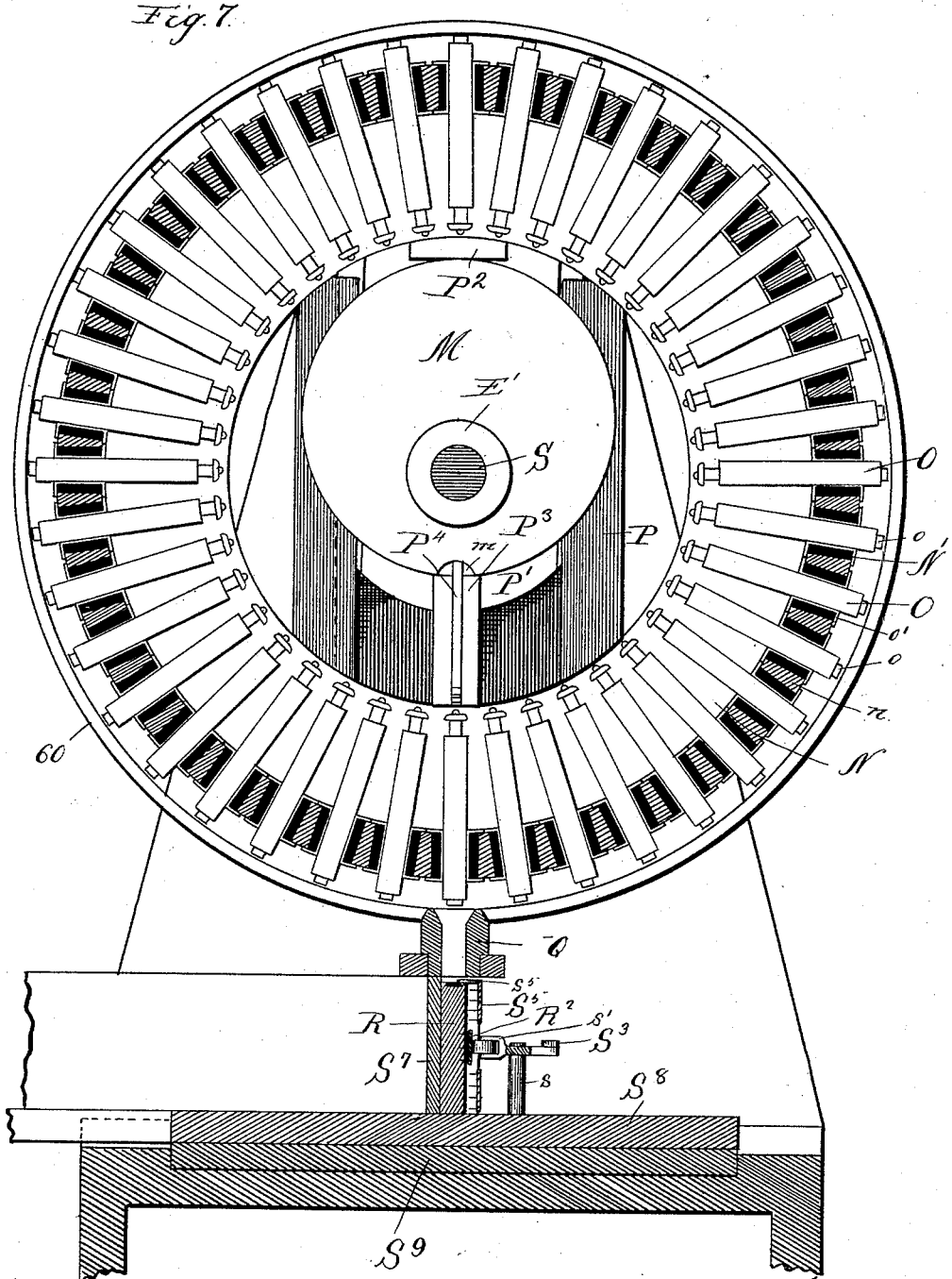

(No Model.) 9 Sheets—Sheet 7.
C. SEARS.
MATRIX MAKING MACHINE.
No. 475,804. Patented May 31, 1892.
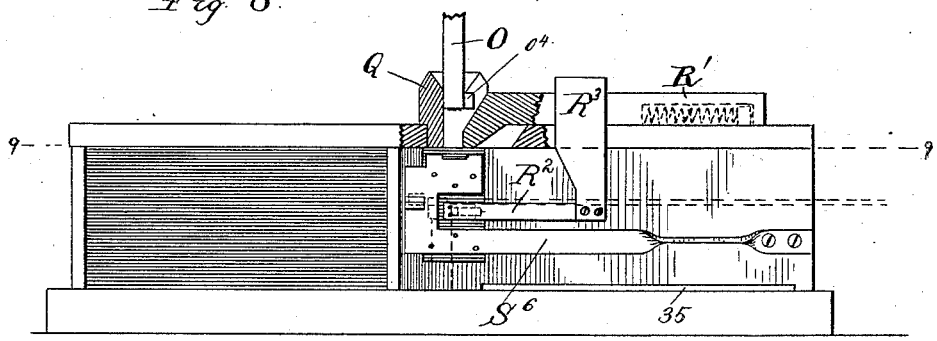
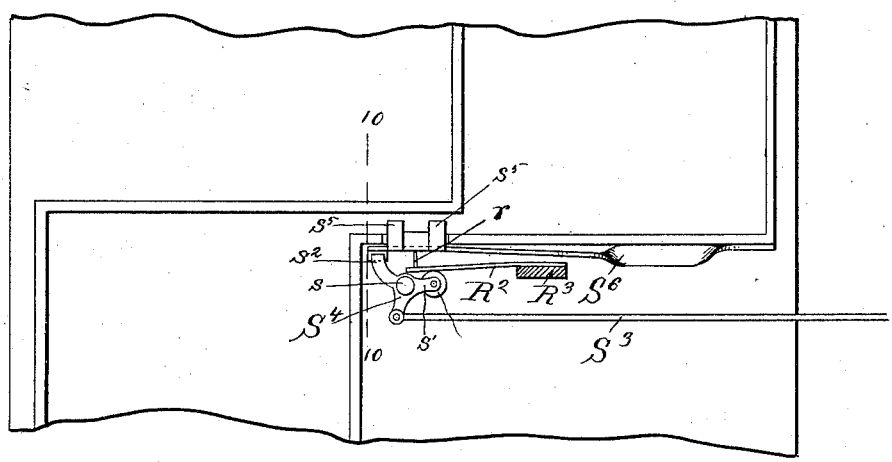
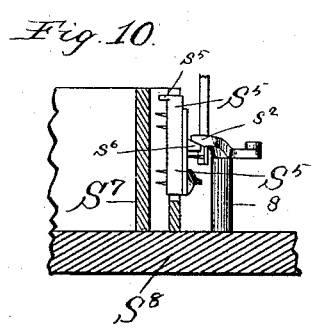
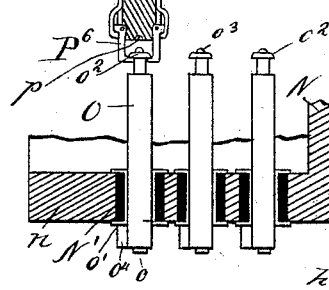
Witnesses:
Lew. C. Curtis.
H. M. Munday
Inventor:
Charles Sears
By Munday
Evarts & Adcock
His Attorneys:

(No Model.) 9 Sheets—Sheet 8.
C. SEARS.
MATRIX MAKING MACHINE.
No. 475,804. Patented May 31, 1892.
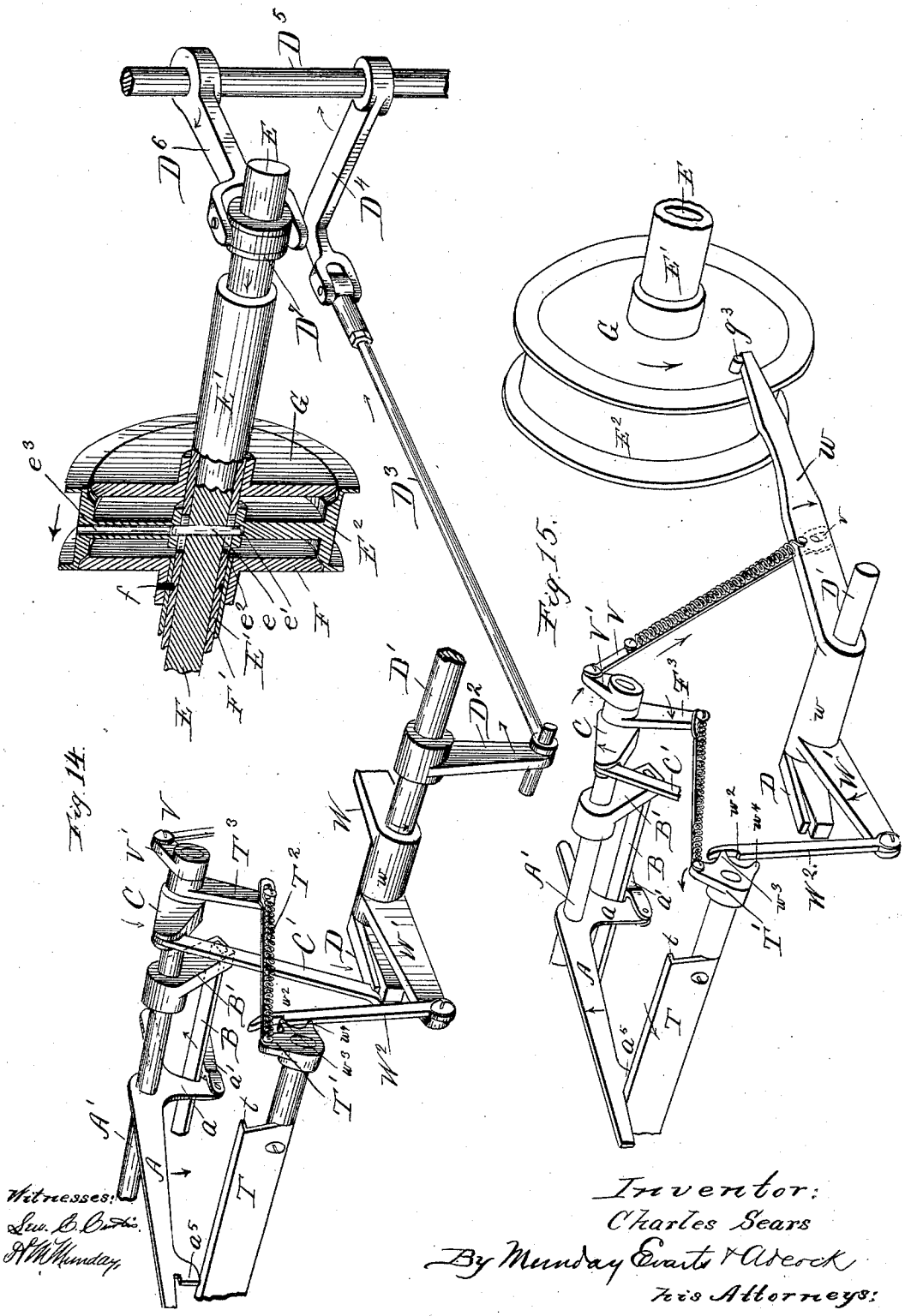
Witnesses:
Inventor:
Charles Sears
By Munday Evarts & Adcock
His Attorneys (No Model.)  9 Sheets—Sheet 9.
C. SEARS.
MATRIX MAKING MACHINE.
No. 475,804. Patented May 31, 1892.
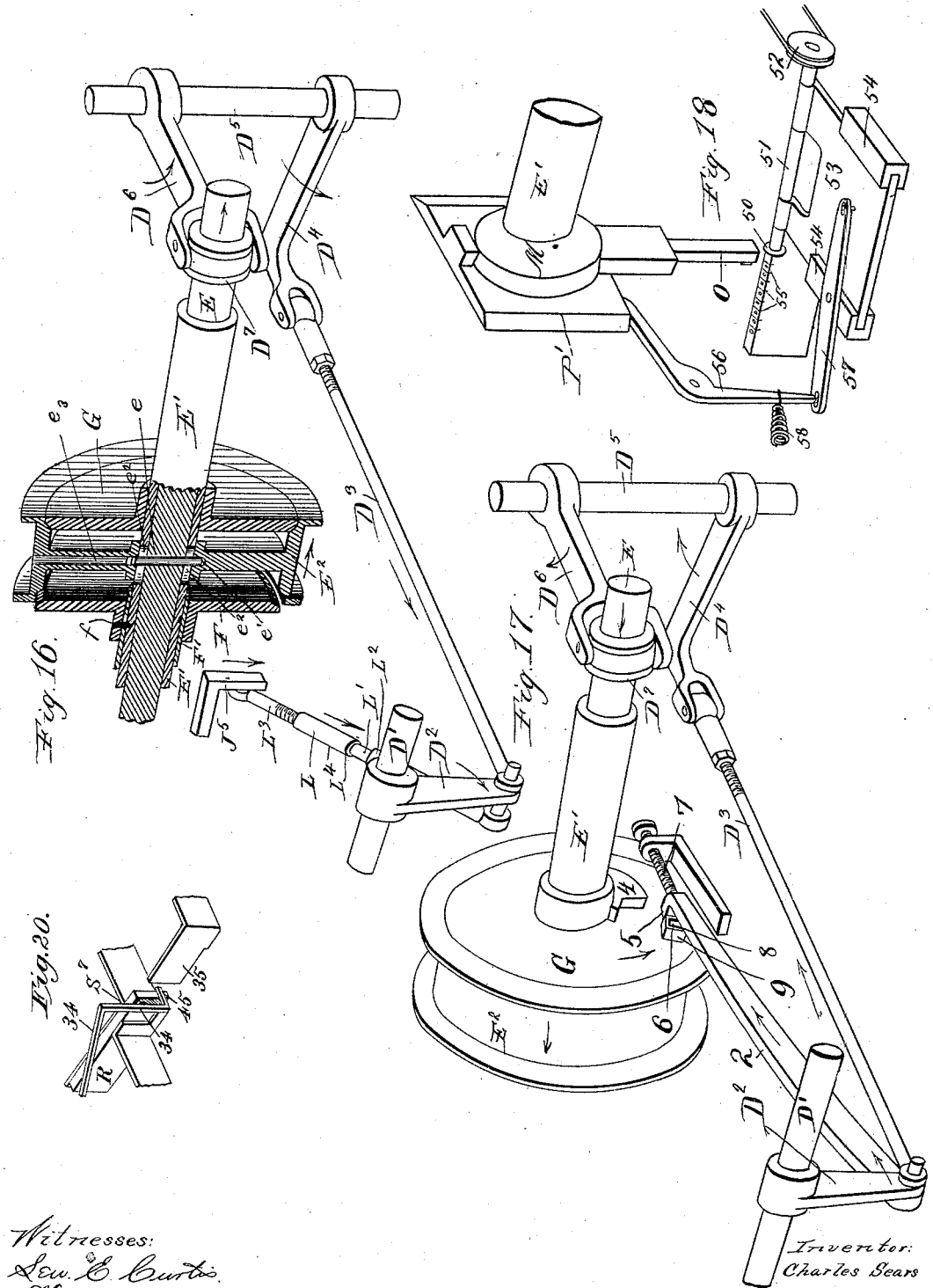
Witnesses:
Lew. E. Curtis
H. M. Munday
Inventor:
Charles Sears
By Munday Evarts & Adcock
His Attorneys

UNITED STATES PATENT OFFICE.

CHARLES SEARS, OF SOUTH EVANSTON, ILLINOIS.

MATRIX-MAKING MACHINE.

SPECIFICATION forming part of Letters Patent No. 475,804, dated May 31, 1892.

Application filed January 25, 1889. Serial No. 297,592. (No model.)

*To all whom it may concern:*

Be it known that I, CHARLES SEARS, a citizen of the United States, residing in South Evanston, in the county of Cook and State of Illinois, have invented a new and useful Improvement in Matrix-Making Machines, of which the following is a specification.

This invention consists of a machine for making matrices, and more especially for forming the matrix upon the ends of strips of wood corresponding in thickness to the vertical width of a line of the type to be impressed or in leaded matter to the width of the type and lead.

One of the main objects of the invention is to provide the operator with means whereby he may instantly detect the errors made by him in impressing the matrix and either discard the matrix-strip which he is then operating upon and in which the error exists or mark it for correction at a future time. This I accomplish by attaching to my matrix-impressing machine a type-writing mechanism connected to and operated simultaneously with the matrix-imposing mechanism, the writing of which is visible as it is produced, so that the operator is enabled to see a duplication or proof of the work done by him as he proceeds.

Another feature of my invention relates to the provision of means whereby as one of the keys is struck and an impression made all the other keys will be locked against movement until the impression is completed and the key struck is released.

The type or impression dies of my matrix-machine are mounted radially in a revolving wheel, and such wheel is rotated until the proper letter is presented to the matrix. During this movement of the wheel it is desirable that the mechanism whereby the dies are actuated to make the impression should be stationary, so as to prevent any accidental actuation by said mechanism of any die other than the proper one, and hence I provide means for locking the die-actuating mechanism during the positioning movement of the die-carrying wheel. On the other hand, it is also desirable that the die-carrying wheel should be held rigidly stationary during the operation of impressing the die, because any movement of that wheel would tend to throw the die either above or below its proper position and cause it to strike outside of the guide provided for it; and thus do injury to the machine. I therefore have provided a brake mechanism which will act to hold the type-die wheel still during the actuation of the die. This mechanism is also adapted to prevent the recoil of the wheel when it is arrested in its rotation upon arriving at the point where it presents the desired die in position over the matrix, and as this stoppage should be a quick one the recoil would be considerable, if not prevented.

As it is a matter of great difficulty to stop the type-die wheel at the exact position required for the making of the impression in precise and true alignment with preceding and following impressions, I provide means for so directing the type as it is moved toward the matrix that it will necessarily strike at the correct point for producing perfect work. These means consist of a guide interposed between the wheel and matrix, having a funnel or inwardly-tapering mouth, which will act when the type-die enters it to truly direct it to the exact spot where the impression should be made, and it may be made to do this whether the die has a tendency to strike above or below the line or at one side of its true position; and to facilitate the action of such a guide I surround the type-dies in their holding-sockets in the wheel with rubber, so that they may yield in any direction to the guide, and thus more readily center themselves in the latter.

Figure 2:
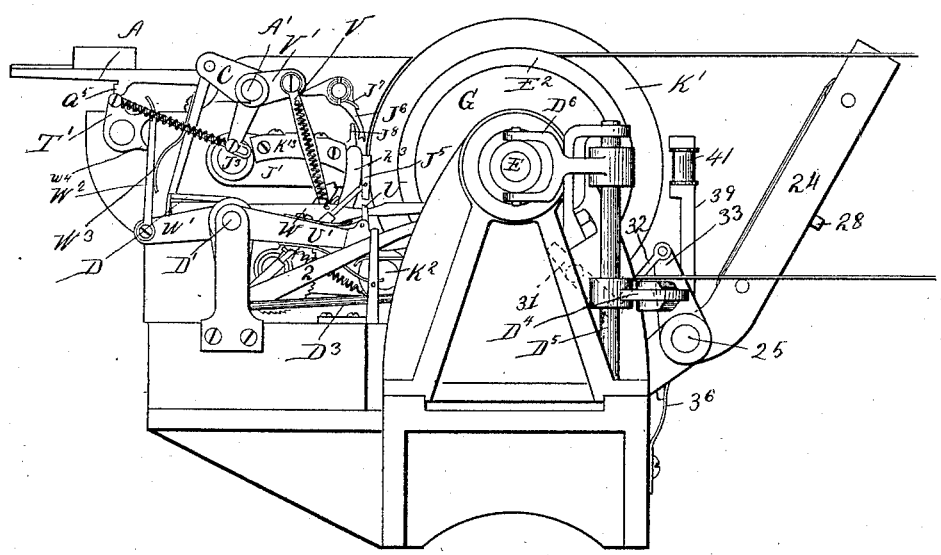
Figure 3:
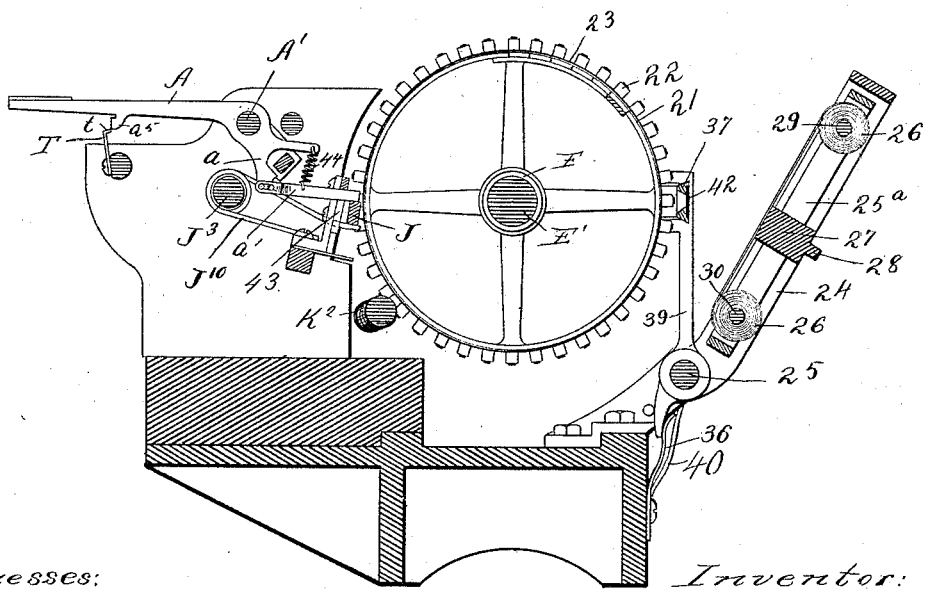

In the accompanying drawings, which form a part of this specification, and in which similar letters and figures of reference indicate like parts, Figure 1 is a plan of the machine. Fig. 2 is an end elevation. Fig. 3 is a vertical cross-section on line 3 3 of Fig. 1. Fig. 4 is a longitudinal vertical section upon the line of the main shaft. Fig. 5 is a vertical cross-section upon the line 5 5 of Fig. 1. Fig. 6 is a similar section on line 6 6 of Fig. 1. Fig. 7 is a detail sectional view of the type-die wheel. Fig. 8 is a vertical section showing the matrix-feeding devices. Fig. 9 is a horizontal section on the line 9 9 of Fig. 8. Fig. 10 is a vertical section on the line 10 10 of Fig. 9. Fig. 11 is a detail section of the type-wheel and the type-actuating devices. Fig. 12 is a peripheral view of a portion of the type-wheel partly in section. Fig. 13 is a section of the type-retracting grippers. Figs. 14, 15, 16, and 17 are perspective diagrams illustrating the operation of different parts of the machine. Fig. 18 is a diagram in perspective representing the device which I contemplate using where the machine is working upon wax and similar matrices. Fig. 19 is a perspective of a matrix of the kind for which my machine is more especially designed. Fig. 20 is a perspective showing the connection between the matrix material and the type-writer paper-carrier.

In the drawings, A A are the keys whereby the operator is enabled to set in motion the type-impressing mechanism. Each of said keys is calculated to secure the impression of a particular letter or character. All of them are loosely mounted upon a pivotal bar-shaft A' and are provided with feet $a$, which are in contact with a longitudinal bar B, secured to cranks B' at either end upon the shaft A'. When a key is depressed, the foot of such key presses back the bar B and through the cranks partially rotates the shaft A'. Said shaft A' also carries at one end another crank C, to which a lever C' is loosely jointed. Such lever is notched at its lower end and engages with a crank D on the shaft D' and acts to depress the crank D when the shaft A' is turned by the depressing of the key. The actuating of crank D in this manner also acts through the crank $D^2$ upon shaft D', the pitman $D^3$, and crank-arm $D^4$ to oscillate a vertical shaft $D^5$. This latter shaft carries a forked arm $D^6$, acting, in connection with the grooved collar $D^7$ upon the short shaft E, as a shifter for the last-named shaft. The crank D is preferably made in two parts, as indicated, the upper or contacting part being attached to the under part by a screw $d^{10}$ and adjusted by the screw $d^{11}$. Said shaft E is let into and has end-play in the hollow end of the main shaft E', carrying a loose belt-pulley $E^2$, whereby power is communicated to the machine. This pulley is also shiftable and is connected to the short shaft E, so as to move with the latter in its endwise movements communicated by the shifting devices already described, such connection being formed by the pin $e$, secured in the shaft E and entering an annular slot $e'$ in the pulley. Room for the pin allowing the endwise movement is provided in the main shaft by the slots or openings $e^2$. Said pin may be inserted by drilling through the web of the pulley, as at $e^3$. At either side of the pulley $E^2$ are located disks F and G, with which the pulley is alternately brought into frictional contact by the shaft-shifting mechanism above set forth.

If the movements attending the striking of one of the keys A are traced out through the various parts thus far described, it will be found to result in the forcing of the belt-pulley against the disk F, thus causing the latter to revolve with the pulley. Now said disk is connected rigidly to a sleeve F', encircling the main shaft loosely, so that it may revolve independently thereof, but prevented from endwise movement thereon by pins $f$, secured in the sleeve and entering an annular groove in the shaft. Upon this sleeve are secured one or more toothed spirals H, having a separate tooth to correspond with each key. When a key is depressed, the arm $a'$, one of which is pivotally joined to the foot $a$ of each key, will be projected horizontally forward, so that its free end will lie in the path of that one of the spiral teeth which corresponds to the letter or key struck. It will now be understood that the rotation of the spiral, due to the contact between the pulley and disk F, and which has been brought about by the depressing of the key, as already seen, will result in the tooth of the spiral striking the free end of arm $a'$ and the forcing downward of the latter and also of the longitudinal bar J, which lies directly underneath the series of arms $a'$ and is supported by the cranks J' and $J^2$, located at its ends and secured to a shaft $J^3$. At the conclusion of this downward movement of the bar further motion of the spiral and its carrying-sleeve is arrested by the application of brake mechanism, as hereinafter described, and at the time of such stoppage the type-die wheel, also carried upon said sleeve, as particularly set forth below, has arrived at such position as that the die of the letter or character corresponding to the key last struck will be directly over the matrix.

The descending motion of bar J, already alluded to, causes the application of the brake mechanism to the spiral and die-wheel-carrying sleeve. This brake mechanism consists of the metal straps K, encircling the disks K' borne upon the sleeve F', and a shaft $K^2$, carrying pulleys $K^3$, in which the ends of said straps are secured and upon which the straps are wound, and thus caused to bind on the disk when said shaft $K^2$ is rotated. Rotation of said shaft $K^2$ for this purpose is brought about as follows: A belt or band $K^4$ encircles the sleeve F' and transmits power to a wheel $K^6$, and by means of a small pulley $K^5$ upon the shaft of wheel $K^6$ and a belt or band $K^7$ a reduced motion is imparted to a pulley $K^8$, journaled in the free end of a crank-arm $K^9$ and carrying the ratchet-wheel $K^{10}$. The arm $K^9$ is secured to and operates the shaft $K^2$, to tighten the brake-straps when it is itself actuated, as shortly to be stated. The rotation of the ratchet-wheel is made to carry with it an arm $K^{11}$ (which may be journaled on the shaft of the ratchet) through the engagement with the ratchet-wheel of the pawl $K^{12}$, mounted on said arm $K^{11}$, and such rotation continues until the crank J' has descended sufficiently to bring about engagement between the arm $K^{11}$ and the guard $K^{13}$, having a curved under face and secured to the crank J'. This engagement results in the depressing of crank-arm $K^9$ in unison with that of the crank J' and the throwing into operation of the brake-straps.

It also results in the freeing of the pawl from the ratchet by the contact of the arm $k$, joined to the main arm $K^{11}$, with the stationary guard $k'$, so that said arm is free to return to its normal position (see Fig. 6) in obedience to spring $k^2$ as soon as the crank-arm $J'$ has receded. By thus moving the arm $K^{11}$ through the ratchet and pawl I graduate its position relative to the descending crank $J'$, so that the contact between those parts and the consequent operating of the brake may take place very quickly or less quickly, according as the amount of rotation given to the sleeve has given it much or little momentum. The longer time the sleeve $F'$ is in rotation before the proper die is brought into position the greater momentum the die-wheel will have acquired. The amount of movement of the arm $K^{11}$ toward the vertical position is proportionate to the amount of movement of said sleeve, since said movement is produced by the movement of said sleeve, and the more nearly the said arm approaches the vertical position the nearer its end is brought to the under side of the guard $K^{13}$. Consequently when the crank $J'$ begins its downward movement, caused by the movement of the descending bar J, hereinbefore described, the guard $K^{13}$ will most quickly strike the arm $K^{11}$ and cause its downward movement and the consequent setting of the brake when the arm $K^{11}$ is most nearly vertical. On the other hand, when the sleeve $F'$ has moved only a slight distance before the proper shoulder on the spiral strikes the arm $a'$ it will have acquired a comparatively slight momentum. At the same time it will have caused a comparatively slight movement of the arm $K^{11}$ toward the vertical position, wherefore the guard $K^{13}$ must move a greater distance than before explained before it will strike the end of arm $K^{11}$ and thereby set the brake. Not only is the brake applied more or less quickly in proportion to the momentum acquired by the sleeve $F'$, but the more quickly it is applied the more firmly it is applied, because, since the downward movement of the guard $K^{13}$ is always the same, it will move the arm $K^{11}$ and the crank $K^9$ downward a greater or less distance, according to whether it strikes the arm $K^{11}$ in the first or last part of its own movement. The depression of the bar J consequent upon the striking of one of the keys also results in a shifting of the driving-pulley from contact with the sleeve-operating disk F into contact with the disk G. This operation is immediately followed by the application of the brake, as already described, so that the sleeve becomes stationary very soon after its motive power is withdrawn from the disk F. It will be remembered, also, that at this time the die-wheel has carried the die corresponding to the key struck to the proper position for its impression on the matrix. The shifting of the driving-pulley is accomplished by an extensible pitman L, extending from the end of the bar J (or from an extension $J^5$ thereof) to the wrist-pin of crank $D^2$, such pitman consisting of the telescoping parts $L'$ $L^2$ and the male and female threaded parts $L^3$ $L^4$. The crank $D^2$ is now compelled by said pitman to move back, or in a direction contrary to the movement previously imparted to it by the striking of a key, and such backward motion of the crank causes the shifting of the driving-pulley into contact with disk G through the medium of the connecting parts $D^3$ to $D^6$, inclusive. The disk G is fixedly mounted upon the main shaft $E'$ and actuates the same when the pulley is thus shifted against it. The shaft, now moving with the motor-pulley, brings into action the device whereby the dies are impressed upon the matrix—to wit, the cam M, mounted upon the shaft.

I will now describe the type-die wheel, which, as before stated, is mounted upon the sleeve $F'$, and the manner of impressing the type through the cam M. The wheel consists of a disk N, having a peripheral side flange $n$. In the flange is secured the series of type-dies O, the outer ends whereof are furnished with the characters or letters $o$ to be impressed. The wheel may carry two or more series of these dies; but each series should be complete in itself and be arranged in a single line around the wheel. The manner of securing these dies in the wheel is peculiar, as I desire them to be capable of yielding slightly when they enter the guide by which they are accurately centered upon the matrix, and for this purpose I inclose them in rubber thimbles or bushings $N'$, secured in openings in the wheel and adapted to exert a pressure upon the dies sufficient to hold the latter stationary during the movements of the wheel, and, indeed, to hold them at all times when they are not operating upon the matrix. To avoid wear upon the rubber, and also to avoid friction in the sliding movement of the dies, brass strips $o'$ are interposed between the thimbles and the dies, such strips being independent of each other and exerting no pressure upon the dies, except such as is caused by the rubber springs surrounding them. Within or at the side of the wheel are guides P, to which is fitted a sliding piece $P'$, encircling the main shaft and having a rider-block $P^2$ at the top of the cam M and a flange $P^3$ at the bottom thereof, so that said slide is actuated by the cam both up and down. The plunger in the descending movement drives the die which may at the time be in position under it down upon the matrix. The cam at its non-actuating side is recessed, as shown at $m$, which allows a strap $P^4$, passing over and down each side of the plunger, to rise in obedience to the spring $P^5$, inclosed in the body of the plunger, and thus to free the pawls $P^6$ from engagement with the head $o^2$, formed at the inner end of each of the dies. These pawls are forced to grip the head of the dies by the forcing down of the strap $P^4$ at the beginning of the cam's rotation, and at the conclusion of the impression they retract the die to its normal position, the recess $m$ of the cam allowing the strap a slight additional upward movement whereby to withdraw the pawls. At Fig. 4 they are shown in their normal position, and at Fig. 11 they are in operation.

In order to insure proper alignment and position for the impressions, I provide a funnel-shaped guide Q immediately under the die-wheel, such funnel-guide serving to truly center the entering point of the die should it start at one side of its true course. The rubber surrounding the dies allows some sidewise movement by the latter without straining the wheel. At the same time it will be noticed that the inner end of the die is securely held and centered by the entrance of the boss $o^3$ within the corresponding recess $p$ at the lower end of the plunger. The gripping-pawls also assist in straightening the die, as will be obvious from their construction, as shown at Fig. 13.

The matrix is indicated by R. It is made about type-high and also to agree substantially in width and thickness with the same dimensions of a column of type. I also prefer to use wood for the matrix material and to place it in the machine with the fibers running vertically, thereby presenting the ends of the fibers to the type-dies; but it should be understood that my machine is not limited in its use either to the printing of matrices of the particular material or the specified shape or size.

In the operation of the machine the matrix is fed along at each impression a distance equal to the width of the letter struck plus the normal space between successive letters, so that the impressions are automatically spaced, according to the varying widths of the various letters and characters employed. This is a very important feature of the machine, as it enables the production of matrices in which the matter impressed will exactly resemble the same matter set in type, and it will now be described. At one side of each type-die and integral, preferably, therewith is a projecting boss or enlargement $o^4$. These bosses on the different dies are of different sizes and are relatively proportionate to the width of the letters on the dies. As shown in the drawings and as preferably constructed, each boss projects from the forward face of the die-body a distance equal to the width of the letter on said die plus the desired space between the letters. The boss or enlargement $o^4$ when the die descends to make its impression strikes the inclined face of a slide R' and forces the latter in the direction of the feed a distance corresponding to the width of the letter to be struck by the die. At this instant the matrix material is in the embrace of devices connected with said slide, so that it moves along in unison therewith, as will be apparent from subsequent description. This operation of the matrix takes place immediately preceding the impression, the die having some distance to move downward after imparting this movement to the matrix.

To cause the seizing of the matrix by the devices which move it, I employ the following mechanism: Upon main shaft E' is a cam S', actuating a rocking lever $S^2$, carrying a connecting-rod $S^3$, actuating a three-armed piece $S^4$, pivoted stationarily upon a standard $s$. One arm $s'$ of this piece $S^4$ is adapted to act against a horizontal spring $R^2$ when the rod $S^3$ is moved in one direction and to drive the sharp points $r$ upon said spring into the side of the matrix. The spring being retained in this position for a short time and being supported by a bracket $R^3$ from the slide R', it results that the movement of the slide is communicated to and participated in by the matrix. As soon as the matrix is thus positioned the cam S' reverses the lever $S^2$, thus withdrawing the pressure upon the spring and allowing it to spring back and out of engagement with the matrix by its own volition. This reverse movement sets in operation, however, another clamping device whereby the matrix may be held rigidly until the next feed movement, such device consisting of a plate $S^5$, having horizontal projections $s^5$ at its upper edge and supported upon a yielding or spring arm $S^6$, said plate being forced against the matrix with both a downward and sidewise pressure by the sliding contact of the upwardly-bent arm $s^2$, being one of the arms of the tripod $S^4$, with the downwardly-inclined face of the projection $s^6$ upon plate $S^5$. This latter clamping action continues during the making of the impression, so that the matrix is firmly held while being impressed. A vertical side piece $S^7$, rigidly secured to the matrix-bed $S^8$, forms one side of the matrix-clamp S.

As it may be desirable sometimes to adjust the bed $S^8$, I place under it a horizontal wedge $S^9$, as long or longer than the bed itself, and by means of the screw $S^{10}$ move said wedge in or out and obtain thereby very minute adjustments of the bed.

Before describing the various devices for bringing the parts back to their normal position or state of rest preparatory to another impression I will describe, together with some other features, the construction by which when any one key is struck all the others are locked until the operation inaugurated by the key struck is fully completed and the parts have all returned to their normal positions, thereby preventing all possibility of conflict between different keys and the striking of them in too quick succession. Under the series of keys is a longitudinal bar T, stationarily journaled at its ends and capable of a slight rocking motion or oscillation on its journals. At one journal of said bar is a crank T', extending from which is a spring $T^2$, attached at its other end to a crank $T^3$ upon shaft A'. The bar T has a lateral flange $t$ at its upper edge and in its normal position stands with said edge and flange immediately back of a notched downwardly-projecting enlargement $a^5$, provided upon each of the keys, the notch of such enlargement being adapted to receive the flange of the bar. When a key is struck, the notched enlargement is brought down to the plane of the bar-flange and the bar is oscillated forward, so as to bring the flange into the notch of the enlargement, such oscillation being due to the force exerted upon the bar by the spring $T^2$, the latter being distended by the crank $T^3$, which moves with the oscillation already described of shaft A'. When the bar is thus oscillated, not only is the key struck locked, but the remainder of the keys are rendered inoperative from the fact that the bar is now in position directly under the enlargements of all such keys and prevents any downward movement by them, and this lock continues until the bar is oscillated back again, a movement which does not take place until the machine is ready for another impression. The bar J is locked when it reaches its lowest point by the pawl $J^6$, which under the impulse of the spring $J^7$ is moved into position over the upwardly-projecting stop $J^8$, carried by the bar or its crank J'. During the descent of the bar J its extension $J^5$ collides with a pivotal pawl U upon a lever U', loosely journaled upon shaft D' and having a turned-up end $u$, adapted to engage with the pin $g$, borne by disk G, and lock said disk. The pawl U has a foot $u'$, which prevents oscillation except in a direction away from the side upon which the foot is located, and also a spring $U^2$, acting on said foot. The contact between said extension and pawl causes the depression of lever U' and a consequent release of the disk G, this operation taking place immediately before said disk is actuated, as already described; but it will be noticed that said extension and pawl will part company when the former reaches the lower portion of its stroke, as the arcs in which they move give them diverging paths. This results in the freeing of the lever and its return by the spring $U^2$ to its normal position, (indicated at Fig. 5,) where it is ready to stop the disk G when said pin $g^3$ completes a revolution. It is through this lever and pin that the revolution of the main shaft and the parts carried by it is stopped, and also by them that said shaft and parts are locked during the positioning of the type-wheel. The spring $U^2$ may be secured to the bottom of the lever and rest at its free end upon a rod $u^3$, secured in a standard $U^3$. After the making of the impression the main shaft continues its rotation until it has completed its revolution and is stopped by the lever U'. The pin $g^3$ as it nears the end of its rotation strikes, also, a lever W, loosely journaled on the shaft D' and connected by a sleeve $w$ with a crank-arm W', carrying a pawl $W^2$, having a shoulder $w^2$, engaging an arm $w^3$, borne upon the crank T'. Through this mechanism the striking of the lever W causes an oscillation of the locking-bar T back to its normal position, thus releasing the key last struck, so that it may be lifted to its normal position, as hereinafter described, and also releasing the other keys from the locking action of said bar. The partial rotation of the crank T' continues until another arm $w^4$ thereon strikes the body of said pawl $W^2$ and releases the engagement between shoulders $w^2$ and $w^3$. The pawl $W^2$ is kept up to its work by the spring $W^3$, borne upon the neighboring pawl C'. Lever W is also connected through a pitman V with a crank V' upon shaft A', there being a provision for lost motion at one end of said pitman, as at $v$. The depressing of this lever W communicates an oscillation to shaft A' through the connections just mentioned, and such oscillation causes several operations, to wit: a return of the bar B to its normal position; a releasing of the lock upon the bar J by the withdrawing of pawl $J^6$ from its engagement with the stop $J^8$, this being accomplished by the contact of arm $J^9$ upon shaft A' with the other limb of said pawl $J^6$; a release of the brake mechanism, and a positive actuation of the crank T', supplementing the action thereon of the pawl $W^2$. The first of these results—viz., the return of the bar B to its normal position—causes the lifting of the key to its former position and the withdrawal of the stop $a'$ and leaves all the keys with freedom to operate when struck. The releasing of the lock upon the bar J allows the spring $J^{10}$ to act upon the shaft $J^3$ and by oscillating the latter to lift said bar to its position of rest. It also releases the arm $K^{11}$, so that the brake-operating arm $K^9$ is free to rise and loosen the brake-straps.

I have already described the mechanism through which the main shaft is started and stopped; but it remains to describe the mechanism for disengaging the disk G, through which the shaft receives motion from the motor-pulley. This operation is of course coincident in point of time with the stoppage of the shaft, and devices composing the mechanism are the following: The lever 2 is journaled loosely upon the wrist-pin of crank $D^2$, and its free end passes under the main shaft and is upheld by a spring 3. A cam 4 upon the main shaft depresses this lever toward the latter part of the shaft's revolution, so that the laterally-bent end of the lever (indicated at 5) will engage a stop 6, borne by disk G. This engagement results in the pulling by the lever of the crank $D^2$ in the direction indicated by arrows in Fig. 17 and the so actuating of the shifting mechanism acting upon the driving-pulley as to force that pulley away from said disk. This movement, however, must not be sufficient to carry the pulley into contact with the disk F, and to insure its cessation at the right point a stationary adjustable screw 7 is placed in the path of the lever, as shown at Figs. 5 and 17. In this manner the pulley is shifted to a position midway between the disks F and G, where it may revolve without actuating any part of the machine.

The stop 6 is made elastic to lessen the jar of its engagement with the lever by surrounding it with rubber 8 and a protecting metal thimble 9. The disk G completes its revolution at the time the lever completes its function, and the latter is then free to yield to its supporting-spring and move upward out of engagement with the stop to the position shown at Fig. 5.

I prefer to embody the lower-case letters and other characters in one row of the type-wheel, the upper-case letters, &c., in another row, the italics in a third row, and so on, and to make the wheel shiftable along its axis, so that any one of these series of letters can be used at will. Hence the wheel, while it is made to rotate with the sleeve F', is independent thereof in that it can be thus shifted. A desirable construction whereby the wheel is rendered capable of these movements is illustrated more particularly at Fig. 4. The hub 10 of the wheel encircles the main shaft in proximity to the end of the sleeve F' and is provided with a sleeve-like extension 11, entering some distance within said sleeve F', thereby giving the wheel a broad bearing. A short shaft S, resembling the short shaft at the other end of the machine and also lying in the hollow end of the main shaft, carries a key or pin 12, which projects through slots 13 in the shell of the main shaft and enters an annular groove 14 in the hub of the type-wheel. By this construction the shifting of the shaft S is made to shift the wheel, while the rotation of the latter may be insured by the tie-rods 15, which pass through the adjoining brake-disk and connect the type-die wheel with the type-wheel of the type-writing attachment, as explained farther on, or the wheel may be keyed to the sleeve in the ordinary manner. To shift the shaft S, a grooved collar 15$^a$ is secured thereon, and a ring 16, inserted in such groove, is secured to the end of a stationary pivoted hand-lever 17. With this lever a stationary notched or toothed sector 18 and a spring-pawl 19 may be employed to retain it in any position to which it may be moved, the sector also serving as an indicator to the operator, showing which case or style of letters is in operating position. An arm J$^{11}$ is secured to crank J', through which when the bar J descends and oscillates said shaft J$^3$ the pawl C' may be thrown off of the crank D, leaving the latter free to rise. The spirals are each preferably secured to the brake-disks at one end and the disks 20 at the other end. A comb-like guide 43 is employed for the stop-arms $a'$, and springs 44 are employed to retain them therein. The various releasing and return movements now described having taken place, the machine is ready for another impression, which of course will be a repetition of the operations set forth For the production of type-written proof simultaneously with the impressing of the matrix I employ the following mechanism: A type-wheel 21 is provided with one or more series of type 22, corresponding with those upon the type-die wheel, such type being short and secured to a rubber band 23, encircling the wheel 21. This wheel is secured to the type-die wheel by the rods 15, which have freedom to slide in the intervening disks, through which they pass, and, being loose upon the sleeve F', said wheel 21 therefore moves in unison with the type-die wheel in all the latter's movements, both rotary and lateral. Abreast of this wheel 21 is a vibrating and sliding or laterally-moving paper-carrier. This consists of a frame 24, rigidly supported upon the shaft 25, an interior frame 25$^a$, surrounding the paper-rolls 26 26, and a hammer 27, supported upon a bar 28, extending from side to side of the outer frame and adapted to force the paper against the type at each vibration of the frames. The axial rods 29 and 30 of the paper-rolls pass through the sides of both interior and exterior frames, and the latter one is movable longitudinally and serves as a means of communicating the feed movements of the matrix to the paper. The frames are vibrated to bring the paper and hammer into contact with the type-wheel by a pivoted lever 31, one end of which is struck by the pin $g^3$ upon disk G as it passes, thereby causing the lower end of said lever to actuate the link 32 and the crank 33 (the latter fast upon shaft 25) in such manner as to vibrate the frame toward the type and cause the impression upon the paper. The axis 30 is connected to the matrix by a bar 34, bent to conform to the requirements of the case, and, passing through the slot 35 in the stationary side of the matrix-clamp, is made to engage with the advance end of the matrix. The junction between the axis 30 and bar 34 is such as to permit the vibratory movements of the paper-carrying frame, and said axis is prolonged, as shown, so that it may slide in its bearings the distance required in printing a line of matter. Said axis is adapted to move the inner frame 25$^a$ laterally, and the other axis may be stationary. This connection between the paper-carrier inner frame and the matrix causes a movement of the paper-rolls in the direction of the feed in unison with each impulse given the matrix, so that the paper is made to move along the face of the type-writer wheel at exactly the same speed as the matrix moves along under the die-wheel. After each printing operation the frames are retracted by a spring 36. As there is the same difficulty in bringing the type-wheel 21 each time into proper position for making impressions in exact alignment that exists in the case of the die-wheel, I interpose between the paper and the type a funnel-shaped guide 37, which is driven by the hammer upon or over the particular type to be printed and compels it to assume the correct position for the impression before the hammer forces the paper against it. This it is enabled to do without disturbing the wheel by reason of the yielding nature of the rubber backing to which the type is attached.

I thus obtain results with the type of the type-writer very similar to those obtained by the use of the funnel-guide with the type-dies for forming the matrix. This guide is borne upon a bar 38, carried upon standards 39, loosely mounted upon the shaft 25, and, as already stated, is made to do its work by the impression-hammer. It is retracted by the spring 40 acting upon the foot of a standard 39. Said bar also carries spools 41 for the inking-ribbon 42, which, being extended from one spool to the other, passes directly across the funnel-guide. There are great advantages in using square metal for the type-dies. It is easy to correctly position it in the wheel at least so as to insure an impression having its up and down lines in true vertical planes, and when thus correctly positioned it cannot turn or twist in its socket, so as to make an inclined or twisted impression. The letter may also be formed upon it in proper relation to its sides. Upon the other hand, to provide each of the dies with a square socket in the type-wheel would be an expensive matter, and herein an important office is devolved upon the rubber bushing N'—viz., the enabling the use of square type-dies in round sockets or apertures in their carrying-wheel, as they readily yield and conform both to the aperture in which they are placed and to the type which they encircle, as seen at Fig. 12.

While I prefer wood for the matrix material, because the portions driven in by the dies fold in upon themselves and compact in the line in which the impression is given, instead of spreading laterally, and so crowding the neighboring portions out of position and injuring impressions already made, as is the case with some other materials—like wax, for instance—yet these last-mentioned materials may be used in my machine, and to obviate the difficulty of sidewise crowding just mentioned I apply to the machine a mechanism which is adapted to score or channel the matrix between the different letters, and thus provide room to accommodate the lateral movement of the material. A circular blade 50 is mounted upon an arbor 51, driven by a pulley 52 and provided with bearings in a reciprocating carriage 53, sliding in stationary ways 54. The carriage is actuated toward the matrix and into such position that the blade will pass across and score the latter, as shown at 55, each time a letter-die O is depressed, by means of the elbow-lever 56, receiving motion from the slide P and cam M, and the pivoted lever 57, connected to the carriage. This scoring operation should of course be done in season, so that every already-formed impression may be separated by a channel from the portion of the matrix in which the next succeeding impression is made and in advance of the making of such later impression. The blade 50 may be a saw-blade. A spring 58 may be employed to return the carriage after each operation.

A stationary circular shield 60 may be placed around the type-die wheel to prevent any possible dislodgment of the dies through centrifugal action during the rotation of the wheel. The funnel guide Q conforms to the size and form of the bodies of the type-dies, except that there is a slot or opening at one side to admit the gaging-bosses $o^4$, with which the dies are provided at their face ends. This slot partially appears at Fig. 8.

The operation of the machine is, briefly stated, as follows: A matrix-block being duly positioned in the machine and the driving-pulley $E^2$ being set in motion, the operator strikes one of the keys A, thereby rotating the shaft A' and by the mechanical devices described actuating the shifting devices which control pulley $E^2$ to throw said pulley against disk F and by so doing to give movement to the sleeve F'. Said sleeve is now rotated until the tooth upon the one of the spirals H which corresponds to the key struck encounters the arm $a'$ of said key and depresses the same and bar J, thereby setting in operation the brake mechanism acting on the disks E' and also shifting the driving-pulley from contact with the disk F into contact with disk G, the sleeve F' and its spirals and its wheel being thus stopped, while the main shaft E', carrying the die-impressing devices, is set in operation. The impression is now made and the die retracted, the main shaft continuing to revolve until it completes a revolution, at which time the disk G is released by the shifting of the driving-pulley from contact therewith to a central position between it and disk F. At the making of each impression the matrix is moved forward the width of the letter and inter-letter space by the action of itself upon the matrix-carrier. The type-writer wheel moves in unison with the die-wheel, the paper-carrier in unison with the matrix, and the type-writer impressions are made at the same time as the matrix-impressions, and the type-writer impression is therefore an exact duplicate as well in the spacing as in the letters of the matrix.

I claim—

1. In a matrix-making machine, the combination of the type-wheel, a series of radially-movable type-dies carried thereby, and a type-writer wheel mounted on the same axis rigidly connected with said type-die wheel and having a corresponding row of type projecting from its periphery, with a matrix-carrier, a swinging paper-carrier, suitable connections between the paper-carrier and the matrix-carrier to cause their simultaneous and equal feed movement, and mechanism for simultaneously moving, first, one die outward against the matrix, and, second, the paper-carrier toward a corresponding type on the type-wheel, substantially as specified.

2. In a matrix-machine, the combination of a type-die wheel having a plurality of rows of radially-movable dies, a type-wheel having corresponding rows of types, a revoluble shaft upon which both of said wheels are mounted, a spline connection between said shaft and one of said wheels, and a rigid connection between said wheels, whereby they move in unison both in their rotary movement and in their movement on the shaft, substantially as set forth.

3. The combination, with the type-die wheel, of the dies, carried thereby, having yielding bushings, the actuating devices of such dies, and the funnel guide for directing them to the matrix, substantially as specified.

4. The combination, with a rotating type-wheel, a row of laterally-yielding and radially-movable rectangular type-dies carried thereby, and the matrix holding and feeding devices, of automatic mechanism for actuating said dies radially outward to make an impression on the matrix and a rectangular guide having a funnel-shaped opening interposed between the matrix and die for guiding and centering the latter, substantially as set forth.

5. The combination, with the type-die wheel and the dies, of the yielding or rubber bushings whereby the dies are held in the wheel, substantially as set forth.

6. The combination, with the type-die wheel having circular openings for the dies, of the square dies and the rubber bushings encircling the latter and filling the openings, substantially as set forth.

7. The combination, with the die-wheel and the dies, of the rubber bushings and the antifriction plates between the dies and the bushings, substantially as set forth.

8. In a matrix-machine, a type-wheel having type projecting radially therefrom, with a movable platen having a funnel-shaped type-guide and means for moving said platen toward and forcing said guide over the end of one of the types, substantially as and for the purpose specified.

9. A type-writer wheel having type projecting radially therefrom and secured thereto by a rubber connection, a movable paper-carrier, and a funnel-shaped guide movable toward and from said type-wheel and interposed between said wheel and paper-carrier, combined with means whereby said paper-carrier is moved toward the type-wheel and the funnel-shaped guide thereby moved toward and forced over the type to position the same and a spring for retracting said guide, substantially as set forth.

10. The combination, with a rotating die-wheel and a series of radially-movable dies carried thereby, of a radially-movable plunger operating within the rim of said wheel, gripping devices carried by said plunger and adapted to engage with and release the inner ends of said dies, and a rotatable cam on the axis of the type-wheel engaging with said plunger, substantially as described.

11. The combination of the rotatable type-wheel and radially-movable type-dies carried thereby, each having an inner head $o^2$, with a plunger operating within the rim of said wheel, gripping-fingers pivoted thereto, mechanism for operating said fingers, and a cam engaging with said plunger and finger-operating mechanism, substantially as set forth.

12. The combination of a rotatable type-wheel and radially-movable type-dies carried thereby, each having an inner head $o^2$, with a radially-movable plunger, a pair of gripping-fingers pivoted to its outer end, a strap $P^4$ and spring $P^5$, carried by said plunger, and a cam having a recess $m$, whereby said plunger and gripping-fingers are operated, substantially as set forth.

13. The keys having arms $a'$, the bar J under said arms, the shifting mechanism actuated by said bar in its descent, and the driving-pulley, in combination with the toothed spiral for actuating said bar, substantially as set forth.

14. The keys having arms $a'$, the bar J under said arms, the toothed spiral actuating said bar, the shifting mechanism actuated by said bar in its descent, and the driving-pulley, in combination with the disk G and the die-actuating cam on the same shaft with said disk, substantially as set forth.

15. In a matrix-machine, a rotating type-die wheel, dies radially disposed in the periphery of said wheel and supported in yielding bushings, and an automatic actuating device for said dies, in combination with a guide for directing the dies down upon the matrix, substantially as specified.

16. A type-die wheel adjustable along its axis and having a lateral flange carrying the dies, in combination with a rotating cam stationarily located within the flange of the wheel and mechanism for shifting the wheel at will, substantially as set forth.

17. The die-wheel having a lateral flange $n$ and openings in said flange for the type-dies, in combination with said dies and their yielding bushings, substantially as set forth.

18. The rotatable die-wheel having a lateral flange and the type-dies carried in said flange, in combination with a separately-rotatable cam located inside the flange and a plunger operated by said cam and actuating the die which may at the time be in position over the matrix, substantially as set forth.

19. The rotatable die-wheel having a lateral flange, the type-dies carried in said flange, and means for locking said wheel in position, in combination with a separately-rotatable cam located inside the flange and a plunger operated by said cam and actuating the dies, substantially as set forth.

20. The rotatable die-wheel having a lateral flange and the type-dies carried in said flange, in combination with a separately-rotatable cam located inside the flange, a plunger operated by the cam and actuating the dies, and means for locking said cam during the positioning of the die-wheel, substantially as set forth.

21. The rotatable die-wheel, the type-dies carried thereby, and the brake locking said wheel, in combination with the separately-rotatable cam, the plunger operated by the cam and actuating the dies, and devices whereby said cam may also be locked, substantially as set forth.

22. The combination, with the type-die wheel and die-actuating cam, of the disk F and sleeve F', whereby said wheel is rotated, the disk G and main shaft E, whereby the die-actuating cam on the axis of the type-wheel is rotated, and the driving-pulley and its shifting mechanism for actuating said disks, substantially as set forth.

23. The die-wheel and its actuating-disk F, the die-actuating cam and its actuating-disk G, the driving-pulley located between said disks and shiftable into contact with either of them or to an intermediate position out of contact with either, and shifting mechanism for automatically moving the pulley into these several positions, all combined and operating substantially as set forth.

24. The combination, in a matrix-machine, of the type-dies carrying gaging-bosses $o^4$ near their operating-faces, and funnel-shaped guides for directing the dies truly upon the matrix, said guides being cut away at the side to admit said bosses, substantially as set forth.

25. In a matrix-machine, a shifting driving-pulley, in combination with the series of keys, the bars J under the keys, the toothed spiral acting with the keys to depress said bar, and the mechanical connections between said bar and the pulley, substantially as set forth.

26. The combination, with the bar J, of the series of keys, each key having an arm $a'$, and the rotating tooth-carrying device striking against said arms and depressing said bar, substantially as set forth.

CHARLES SEARS.

Witnesses:
EDW. S. EVARTS,
H. M. MUNDAY.